US012679632B2

(12) United States Patent
Kalitvencevs et al.

(10) Patent No.: US 12,679,632 B2
(45) Date of Patent: Jul. 14, 2026

(54) RETAINER

(71) Applicant: B/E Aerospace (UK) Limited, Leighton Buzzard (GB)

(72) Inventors: Germans Kalitvencevs, Milton Keynes (GB); Samuel Steadman, Coventry (GB)

(73) Assignee: B/E AEROSPACE (UK) LIMITED, Leighton Buzzard (GB)

( * ) Notice: Subject to any disclaimer, the term of this patent is extended or adjusted under 35 U.S.C. 154(b) by 0 days.

(21) Appl. No.: 18/888,943

(22) Filed: Sep. 18, 2024

(65) Prior Publication Data

US 2025/0162790 A1      May 22, 2025

(30) Foreign Application Priority Data

Nov. 21, 2023      (EP) ..................................... 23275165

(51) Int. Cl.
| | |
|---|---|
| *B65D 90/00* | (2006.01) |
| *B60R 5/00* | (2006.01) |
| *B65D 88/14* | (2006.01) |

(52) U.S. Cl.
CPC ............ *B65D 90/0053* (2013.01); *B60R 5/00* (2013.01); *B65D 88/14* (2013.01)

(58) Field of Classification Search
CPC ...... B65D 90/0053; B65D 88/14; B60R 5/00; B62B 3/005; B62B 3/006; B62B 3/108; B62B 3/004
USPC ...................................................... 220/23.89
See application file for complete search history.

(56) References Cited

U.S. PATENT DOCUMENTS

| | | | | |
|---|---|---|---|---|
| 2,534,169 A | * | 12/1950 | Hope ..................... A47F 1/065 |
| | | | | 221/310 |
| 3,589,277 A | * | 6/1971 | Gray .................... B30B 9/3092 |
| | | | | 100/270 |
| 4,114,965 A | * | 9/1978 | Oye ..................... A61G 12/001 |
| | | | | D24/185 |
| 5,001,977 A | * | 3/1991 | Tracy ................... B30B 9/3042 |
| | | | | 100/294 |
| D327,760 S | * | 7/1992 | Donnelly ......................... D34/1 |
| 5,404,999 A | * | 4/1995 | Bednar ............... A01K 1/0107 |
| | | | | 383/33 |

(Continued)

FOREIGN PATENT DOCUMENTS

| | | |
|---|---|---|
| EP | 3778396 | 2/2021 |
| EP | 3265384 | 1/2022 |
| GB | 2306553 | 5/1997 |

OTHER PUBLICATIONS

European Patent Office; European Search Report dated May 23, 2024 in Application No. 23275165.1.

*Primary Examiner* — Ernesto A Grano
(74) *Attorney, Agent, or Firm* — SNELL & WILMER L.L.P.

(57) ABSTRACT

A retaining assembly, for a galley, including a retaining arm, a mounting rod and a biasing device. The retaining arm is movable between a non-retaining position and a retaining position. When in the retaining position, the retaining arm is arranged to prevent movement of an item in a retaining direction. The retaining arm is adjustably mounted to the mounting rod, such that its position on the mounting rod is adjustable in the retaining direction. The biasing device is arranged to provide a biasing force on the retaining arm to bias its position on the mounting rod.

15 Claims, 4 Drawing Sheets

(56) References Cited

U.S. PATENT DOCUMENTS

| | | | | |
|---|---|---|---|---|
| 5,490,455 | A * | 2/1996 | Conti | B64D 11/04 |
| | | | | 100/229 A |
| 5,548,982 | A * | 8/1996 | Rawling | E05B 5/003 |
| | | | | 70/229 |
| 5,611,270 | A * | 3/1997 | Harrington | B65F 1/163 |
| | | | | 100/902 |
| 5,626,353 | A * | 5/1997 | Campbell | A47B 31/02 |
| | | | | 280/47.35 |
| 6,000,486 | A * | 12/1999 | Romick | B62D 51/04 |
| | | | | 180/209 |
| 7,273,155 | B1 * | 9/2007 | Gray | B65F 1/065 |
| | | | | 220/8 |
| 7,401,708 | B2 * | 7/2008 | Lin | B65F 1/06 |
| | | | | 220/495.1 |
| 7,510,223 | B2 * | 3/2009 | Malkowski, Jr. | E05B 15/022 |
| | | | | 292/341.15 |
| 8,696,028 | B2 * | 4/2014 | Nelson | A47L 13/50 |
| | | | | 280/47.35 |
| 8,936,260 | B2 * | 1/2015 | Burd | B62B 3/004 |
| | | | | 280/47.35 |
| 9,238,926 | B2 * | 1/2016 | Guerrero | E05B 17/2076 |
| 9,267,314 | B2 * | 2/2016 | Kibler | B60P 1/26 |
| 9,302,440 | B2 * | 4/2016 | Doaran | B30B 9/3085 |
| 9,523,219 | B2 * | 12/2016 | Macernis | E05B 47/004 |
| 9,637,236 | B2 * | 5/2017 | Vandewall | A47B 69/00 |
| 9,809,239 | B1 * | 11/2017 | Reiss | B30B 9/3046 |
| 10,072,442 | B2 * | 9/2018 | Smith | E05B 15/024 |
| 10,087,664 | B2 * | 10/2018 | Auriac | B64D 29/08 |
| 10,273,006 | B2 * | 4/2019 | Reiss | B65F 1/1426 |
| 10,427,791 | B2 * | 10/2019 | Beets | B62B 3/02 |
| 10,472,068 | B2 * | 11/2019 | Coombs | F25D 17/045 |
| 10,518,794 | B2 * | 12/2019 | Jackson | B62B 3/10 |
| 11,167,926 | B2 * | 11/2021 | Vlaming | B64D 11/0007 |
| D941,744 | S * | 1/2022 | Burd | E05C 3/004 |
| | | | | D12/415 |
| 11,235,879 | B2 * | 2/2022 | Elshaw | B64F 5/00 |
| 11,529,987 | B2 * | 12/2022 | Dowty | B62B 3/003 |
| 12,031,362 | B2 * | 7/2024 | Brownlie | E05C 19/10 |
| 2001/0009347 | A1 * | 7/2001 | Kasuya | A47B 31/06 |
| | | | | 312/409 |
| 2002/0182102 | A1 * | 12/2002 | Fontenot | B65F 7/00 |
| | | | | 422/5 |
| 2004/0207168 | A1 * | 10/2004 | Raab | A47J 39/006 |
| | | | | 280/79.2 |
| 2006/0108757 | A1 * | 5/2006 | Brookmire | B62B 3/006 |
| | | | | 280/47.34 |
| 2008/0172295 | A1 * | 7/2008 | Watson | G06Q 30/0277 |
| | | | | 705/14.73 |
| 2008/0247680 | A1 * | 10/2008 | Wallace | B65F 1/1415 |
| | | | | 383/33 |
| 2009/0044547 | A1 * | 2/2009 | Oswald | F25D 11/003 |
| | | | | 62/190 |
| 2010/0050665 | A1 * | 3/2010 | Oswald | F25D 17/06 |
| | | | | 700/282 |
| 2011/0025006 | A1 * | 2/2011 | Knoppers | A47B 31/00 |
| | | | | 292/8 |
| 2011/0248458 | A1 * | 10/2011 | Belanger | B29C 66/721 |
| | | | | 156/92 |
| 2011/0277489 | A1 * | 11/2011 | Schalla | B64D 11/0007 |
| | | | | 62/457.2 |
| 2011/0278879 | A1 * | 11/2011 | Belanger | B29C 70/86 |
| | | | | 296/187.01 |
| 2012/0103206 | A1 * | 5/2012 | Doaran | B64D 11/0007 |
| | | | | 100/193 |
| 2013/0270988 | A1 * | 10/2013 | Nicholson | A47B 96/00 |
| | | | | 312/400 |
| 2013/0333550 | A1 * | 12/2013 | Jacobsen | B64D 11/04 |
| | | | | 89/36.09 |
| 2014/0021690 | A1 * | 1/2014 | Burd | B62B 3/003 |
| | | | | 280/47.35 |
| 2014/0331722 | A1 * | 11/2014 | Bridgewater | E05C 3/042 |
| | | | | 292/65 |
| 2014/0367974 | A1 * | 12/2014 | Keely | E05C 1/06 |
| | | | | 292/57 |
| 2015/0182833 | A1 * | 7/2015 | Hu | A63B 69/224 |
| | | | | 482/87 |
| 2017/0043857 | A1 * | 2/2017 | Seibt | B64D 11/003 |
| 2017/0166310 | A1 | 6/2017 | Wallbott et al. | |
| 2017/0356222 | A1 * | 12/2017 | Braz | E05C 1/04 |
| 2018/0016011 | A1 | 1/2018 | Burd et al. | |
| 2018/0094466 | A1 * | 4/2018 | Schneider | E05B 47/004 |
| 2018/0273157 | A1 * | 9/2018 | Hoogeveen | E06B 3/482 |
| 2018/0297706 | A1 * | 10/2018 | Beets | F25D 3/125 |
| 2022/0153329 | A1 | 5/2022 | Lange et al. | |

* cited by examiner

300''

400

RETAINER

CROSS-REFERENCE TO RELATED APPLICATIONS

This application claims priority to EP Patent Application Ser. No. 23275165.1, filed Nov. 21, 2023 and titled "RETAINER," which is incorporated by reference herein in its entirety for all purposes.

FIELD

This disclosure relates to retaining assemblies, especially for retaining items in storage units in galleys such as aircraft galleys.

BACKGROUND

A galley, for example an aircraft galley, may include one or more storage units for storing certain items. Items may include for example storage boxes or trolleys.

A galley, particularly a vehicle galley such as an aircraft galley, a train galley or a boat galley, may experience significant movement during use (e.g. pitching or rolling of the vehicle) which means that items stored in a storage unit need to be retained in place.

In order to retain items in place, storage units typically have one or more retaining assemblies to hold the relevant stored item against excessive movement. The retaining assembly can be operated to move a retaining arm into a position in which the item is held securely in place and can also be operated to release the retaining arm so that the item can be extracted. One example of a retaining assembly is known as a turn button and comprises a lever located at the front of the storage unit that can be rotated 90 degrees between a first position in which it partially blocks the front of the storage unit and a second position in which the front of the storage unit is unblocked such that a stored item can be removed. Some storage units are designed to accommodate more than one size of item. For example, a full size item (occupying substantially the full depth of the storage unit) can be retained with one or more turn buttons at the front of the storage unit. However, a smaller item which would occupy less than the full depth of the storage unit needs to be retained at a different depth so as to prevent excessive movement within the storage unit. To achieve this, an intermediate retainer can be provided that is arranged to retain an item within the storage unit. An intermediate retainer may be provided to retain an item at the rear of the storage unit (e.g. retained between the intermediate retainer and the back wall of the storage unit) or it may be provided to retain an item at the front of the storage unit (e.g. retained between the intermediate retainer and the turn button(s) at the front of the storage unit). It will be appreciated that such an intermediate retainer may provide both functions such that it can retain two suitably sized items, i.e. one in the front and one in the rear of the storage unit. Such intermediate retainers are fixed in place at an appropriate position according to the specific galley requirements, i.e. according to the dimensions of the items that are to be stored.

SUMMARY

When viewed from a first aspect, the present disclosure provides a retaining assembly for a galley comprising:
a retaining arm;
a mounting rod; and a biasing device;
wherein the retaining arm is movable between a non-retaining position and a retaining position;
wherein when in the retaining position, the retaining arm is arranged to prevent movement in a retaining direction;
wherein the retaining arm is adjustably mounted to the mounting rod such that its position on the mounting rod is adjustable in the retaining direction; and
wherein the biasing device is arranged to provide a biasing force on the retaining arm to bias its position on the mounting rod.

A retaining assembly according to the first aspect enables the position of the retaining arm on the mounting rod to be adjusted, for example so as to position the retaining arm in an appropriate position to selectively retain an item having a certain size. For instance, the position of the retaining arm may be moved from a first position, for selectively retaining an item having a first size, to a second position, for selectively retaining an item having a second size. This adjustment may be made after the mounting rod has been installed in a certain position. The biasing device may facilitate straightforward adjustment of the position of the retaining arm on the mounting rod. For example, the biasing force may bias the retaining arm in one direction and thus can cause movement (adjustment) of the retaining arm in that direction. The retaining arm may be adjusted in the opposite direction by applying a force greater than the biasing force.

The mounting rod may be arranged to be installed in a fixed position. For example, adjustment of the position of the retaining arm on the mounting rod may adjust the position of the retaining arm relative to this fixed position.

The mounting rod may be parallel, or substantially parallel, to the retaining direction. Therefore, adjustment of the retaining arm along the mounting rod causes adjustment of the position at which an item is retained by the retaining arm. The retaining direction may be, perpendicular, or substantially perpendicular, to the retaining arm when the retaining arm is in the retaining position.

The retaining arm could be movable between the non-retaining position and the retaining position in any suitable manner. For example, the retaining arm could be arranged to move laterally or it could be arranged to rotate in a plane substantially parallel to the retaining direction. However, in some examples, the retaining arm is movable between the non-retaining position and the retaining position by rotating in a plane substantially perpendicular to the retaining direction. This may be particularly convenient to manufacture, install and operate, due to its relative simplicity. For example, the retaining arm may be movable between the non-retaining position and the retaining position by rotating around the mounting rod. Additionally, rotation of the retaining arm may be actuated by rotation of the mounting rod. Such arrangements can also be moved out of the way (to the non-retaining position) easily even when items are held within the storage unit as the retaining arm will generally be free to move in the gap between a front item and a rear item (that gap being a planar gap perpendicular to the retaining direction).

In some examples, the retaining assembly further comprises a first limiter arranged to limit movement of the retaining arm caused by the biasing force. The first limiter could be provided by shaping of the rod, such as a widening of the rod, which limits adjustment of the position of the retaining arm on the mounting rod. In some examples the first limiter could be attached to the rod. In other examples, the first limiter could be arranged proximate to the rod, for example a stopper arranged adjacent to the rod to obstruct movement of the retaining arm.

The biasing device could provide a biasing force that moves the retaining arm in a direction towards the biasing device. For example, the biasing device could be a spring under tension which is arranged to provide a biasing force on the retaining arm to pull the retaining arm towards the spring. In such examples, the first limiter (arranged to limit movement of the retaining arm against the biasing force), could be on the same side of the retaining arm as the biasing device. In other examples, the first limiter and the biasing device are arranged on opposite sides of the retaining arm. For example, the biasing device may be arranged to apply a biasing force to move the retaining arm away from the biasing device, and the first limiter may be arranged on the opposite side of the retaining arm so as to limit movement of the retaining arm in that direction.

The first limiter could be in a fixed position on the mounting rod. However, in some examples the first limiter is adjustably mounted to the mounting rod such that its position on the mounting rod is adjustable in the retaining direction. With this arrangement, one limit of movement of the retaining arm can be adjusted. If the biasing means biases the retaining arm against the first limiter, then adjusting the position of the first limiter will adjust the position of the retaining arm on the mounting rod.

In some examples, the mounting rod comprises a threaded portion and the first limiter is threadedly mounted on the threaded portion such that rotating the first limiter relative to the threaded portion adjusts its position on the mounting rod. This allows for easy adjustment of the position of the retaining arm by rotating the first limiter. By way of example, the first limiter may be a nut threaded onto the threaded portion of the mounting rod. An adjustment can be made while the mechanism is installed in a galley with an appropriate tool (such as a spanner) with minimal (or possibly with no) disassembly of the storage unit. Thus, a storage unit can be adjusted to accommodate a different sized item very quickly and simply so as to meet different requirements.

In some examples, the retaining assembly further comprises a second limiter arranged to limit movement of the retaining arm against the biasing force. Movement against the biasing force may be understood to mean movement in a direction opposite to the direction of the biasing force. For example, applying a force greater than the biasing force in the opposite direction to the biasing force may cause adjustment of the position of the retaining arm on the mounting rod until the second limiter limits any further movement. The second limiter could be anything suitable to limit adjustment of the position of the retaining arm on the mounting rod. For example, the second limiter could be any of: a stopper, e.g. arranged proximate to the mounting rod; a nut, threaded onto the mounting rod; a bracket, attached to the mounting rod; or a shaping of the mounting rod (e.g. an integrally moulded stopper). In some examples, the second limiter may be a sleeve provided around the mounting rod and optionally also provided around or within the biasing device. In examples that have both a first limiter and a second limiter, the second limiter could be similar to the first limiter, but arranged to limit movement in the opposite direction. It is also possible that the second limiter may be dissimilar to the first limiter.

The biasing device could provide a biasing force that moves the retaining arm in a direction towards the biasing device. In such examples, the second limiter (arranged to limit movement of the retaining arm against the biasing force) could be on the opposite side of the retaining arm to the biasing device. In other examples, the second limiter and the biasing device are arranged on the same side of the retaining arm. For example, the biasing device may provide a biasing force which biases the retaining arm away from the biasing device and the second limiter may limit adjustment of the retaining arm towards the biasing device. For example, the biasing device could be a spring in compression, arranged to provide a force to bias the position of the retaining arm away from the spring, and the second limiter could be, for example, a stopper on the same side of the retaining arm as the spring.

The biasing device could be any suitable device for applying a force on the retaining arm. For example, the biasing device could apply a magnetic biasing force on the retaining arm, and thus the biasing device could be a permanent magnet, an electromagnet or the like. The biasing device could apply an elastic force on the retaining arm. For example, the biasing device may be an elastic member, such as a rubber member, arranged to apply a force when in compression or in tension. In some examples, the biasing device is a spring.

In examples where the biasing device is a spring, the spring could be arranged substantially parallel to the mounting rod so as to provide maximal force on the retaining arm. Although any type of spring may be used, in some examples, the retaining assembly is a coil spring wound around the mounting rod. Winding the coil spring around the mounting rod is space efficient and allows a force to be applied close to (or substantially on) the axis of the mounting rod.

In examples including a second limiter and a spring, the spring may be able to compress (and thereby allow adjustment of the position of the retaining arm) for a certain compression distance until the second limiter prevents further compression of the spring. In some examples, the second limiter is a tube or sleeve positioned around the coil spring. Thus, when the retaining arm is in contact with the tube, further compression of the spring may be limited as the tube may be arranged to obstruct further movement of the retaining arm. In other examples, a stopper may be provided inside the coil spring with a similar effect.

In some examples, the biasing device is arranged to provide the biasing force when it is compressed. For example, the biasing device may be an elastic member, such as a coil spring, arranged to provide the biasing force when in compression.

The biasing device could be arranged such that when the position of the retaining arm on the mounting rod is in a certain position, there is no biasing force present (i.e. the biasing device is in an unstressed, relaxed state). For example, in cases where the biasing device is a spring there may be a position on the mounting rod where the spring is not in compression or in tension. However, in some examples, the biasing device is arranged such that it always provides the biasing force, i.e. the biasing device may be pre-loaded (either in compression or tension). For example, when the biasing device is arranged to provide the biasing force when it is compressed, the biasing device may be arranged such that it is always compressed along the full range of retaining arm adjustment so that it always applies a biasing force to the retaining arm, regardless of the retaining arm's position. With such arrangements, the first limiter will define a default position of the retaining arm. The retaining arm will be in this default position in the absence of other forces. The retaining arm may deviate from the default position when a force is applied that is sufficient to overcome the pre-loaded force from the biasing device.

In some examples, the biasing device is arranged to provide a biasing force greater than a maximum expected load on the retaining arm. For example, the basing force may be sufficient to ensure that the position of the retaining arm on the mounting rod does not change when the maximum expected load is applied. When the biasing device is pre-loaded to this level, no movement of the retaining arm is possible until a greater force is applied to the retaining arm. Thus, when normal (expected) use will not provide a sufficient force, the position of the retaining arm is well-defined and will not vary during such normal use. The maximum expected load may be the load that arises from movement of a stored item during normal vehicle movement. For example, in an aircraft galley, the maximum expected load may arise when the aircraft banks at a maximum bank (roll) angle. This, combined with the maximum design load for the stored item can be used to calculate a maximum expected load that will be applied to the retaining arm during normal use. The maximum expected load may be, for example, no more than approximately 100 N, 200 N, 300 N, 400 N, 500 N or 600 N. Thus, the biasing force may be arranged to be at least approximately 100 N, 200 N, 300 N, 400 N, 500 N or 600 N. In some examples the biasing force may be at least 500 N or at least 600 N. In examples where the biasing device is always arranged to provide the biasing force (i.e. where the biasing device is pre-loaded), the biasing force may always be greater than the maximum expected load on the retaining arm, for example so as to fix the position of the retaining arm on the mounting rod in normal use.

In some examples, the biasing device has a stiffness that is sufficient to prevent the position of the retaining arm on the mounting rod from changing by more than an allowable distance when a maximum expected load on the retaining arm is applied. For example, as discussed above, the maximum expected load may be less than approximately 100 N, 200 N, 300 N, 400 N, 500 N or 600 N. The allowable distance may for example be a distance of approximately 1 mm, 2 mm or 5 mm.

By way of example, a biasing device preloaded by 10 mm of compression and with a stiffness of 500 N/cm would provide a preload force of 500 N and would thus not move under a maximum expected load of 500 N. On the other hand, a biasing device with a stiffness of 490 N/cm, pre-loaded with 10 mm compression and experiencing a load of 500 N would compress by approximately an additional 0.2 mm.

In some examples, the biasing device is arranged to provide a biasing force less than a minimum expected force exerted on the retaining arm. The minimum expected force may be the minimum expected force exerted on an item when inserting it into the storage unit. Thus, the minimum expected force may be an expected insertion force. In such examples, the insertion of an item into the storage unit when the retaining arm is in the retaining position will cause the retaining arm to move against the biasing force In some examples, the biasing device is arranged to provide a biasing force less than 100 N, 50 N or 20 N. For example, the biasing force may be sufficiently small that a user can easily apply a force greater than the biasing force to the retaining arm so as to adjust the position of the retaining arm on the mounting rod in use. The biasing force may be sufficiently small that a user inserting an item into the storage unit will likely not notice the additional force required to counter the biasing force. The biasing force essentially serves merely to move the retaining arm to a default position in the absence of any counteracting force.

In some examples, the biasing device has a stiffness less than 50 N/cm, 20 N/cm or 10 N/cm. The biasing device may have a stiffness such that the biasing force remains under a selected limit (e.g. 100 N, 50 N or 20 N) under a compression or extension of at least a selected distance. The selected distance may be, for example, approximately 5 mm, 10 mm or 15 mm. These distances may allow sufficient adjustability (i.e. sufficient range of retaining arm positions) to accommodate a certain array of items to be stored in certain aircraft galley set ups.

In some examples, the biasing device may be arranged to remain in a state of biasing (i.e. to remain in compression or alternatively to remain in tension) across its full range of movement. Thus at both extremes of its movement range it applies at least some small force. This improves the reliability as, in the absence of any load, the retaining arm is always biased to one well-defined extreme of the movement range.

The mounting rod could be arranged to be installed directly on an internal surface of a galley storage unit. Alternatively, in some examples, the retaining assembly further comprising a bracket; the mounting rod is attached to the bracket; and the bracket is arranged to be installed on an internal surface of a galley storage unit. The bracket may enable ease of installation. The internal surface of the galley storage unit may be, for example, a top surface, a bottom surface or a side surface of the galley storage unit.

In some examples, the bracket comprises at least one mounting hole for mounting the retaining assembly to the internal surface of the storage unit.

In some examples, the retaining assembly further comprises an actuating device operable to move the retaining arm between the retaining position and the non-retaining position. Examples of an actuating device include (but are not limited to): a button, a lever, a knob, or the like. The actuating device may be (or may include) the mounting rod. For example, rotation of the actuating device may cause rotation of the retaining arm between the retaining and non-retaining positions. The actuating device may extend from the retaining assembly to a front of a storage unit so that a user can easily operate the retaining assembly while the storage unit has items stored therein.

In some examples, the actuating device is mounted on the mounting rod and is operable to rotate the mounting rod.

When viewed from a second aspect, the present disclosure provides a storage unit for storing one or more items in a galley comprising the retaining assembly according to any of the examples of the first aspect (optionally including any of the optional features discussed above);

wherein the retaining arm is arranged to retain the one or more items in the retaining direction when the retaining arm is in the retaining position.

For example, the retaining arm may be arranged to retain an item on either or both sides of the retaining arm in the retaining direction (e.g. in front of the retaining arm and/or to the rear of the retaining arm).

The storage unit could be, for example, any storage unit for a galley, such as an overhead storage unit, an under-counter storage unit or any other storage unit for a galley such as an aircraft galley. In some examples, the storage unit is a galley trolley compartment and the one or more items are galley trolleys. Certain vessels, for example aircraft, may require a galley trolley compartment to be adjustable so as to be able to store galley trolleys of two or more different sizes. For example, one supplier of galley trolleys may supply trolleys having a certain size, whereas another provider of galley trolleys may supply trolleys having a different size. Thus, it may be particularly convenient for a galley trolley compartment to be adjustable so as to store galley trolleys of different sizes securely.

The storage unit could be arranged to store only a single item. For example, an item in either the rear or the front of the storage unit. In some examples, the storage unit is arranged to store a first item in a rear position of the storage unit and the storage unit is arranged to store a second item in a front position of the storage unit.

In some examples, the retaining assembly is arranged to retain the first item against forward movement from the rear position.

In some examples, the retaining assembly is arranged to retain the second item against rearward movement from the front position.

In some examples, the retaining assembly is arranged to retain the first item against forward movement from the rear position and the second item against rearward movement from the front position.

In some examples, the mounting position of the retaining arm may be fixed in use so as to retain a first and/or second item of a certain size. In some examples, the mounting position of the retaining arm is adjustable in use to move between a first position and second position; wherein when in the first position, the retaining arm is arranged to retain the second item against rearward movement from the front position; and wherein when in the second position, the retaining arm is arranged to retain the first item against forward movement from the rear position. For example, a force greater than the biasing force and in an opposite direction to the biasing force may be applied to the retaining arm in use so as to adjust the position of the retaining arm on the mounting rod from the second position to the first position.

BRIEF DESCRIPTION OF THE DRAWINGS

One or more non-limiting examples will now be described, by way of example only, and with reference to the accompanying figures in which:

FIG. 3b shows another storage unit, such as the storage unit of FIG. 1, having a retaining assembly, such as the retaining assembly shown in FIG. 2, storing a different first item and a different second item from the storage unit shown in FIG. 3a;

DETAILED DESCRIPTION

Figures 1, 2:
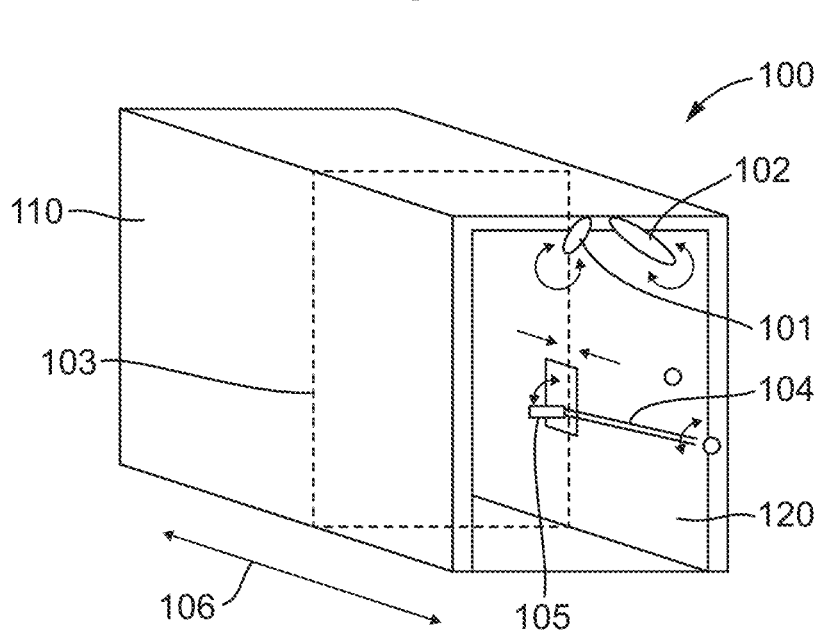
FIG. 1 shows a storage unit for a galley.
FIG. 2 shows a retaining assembly for a storage unit, such as the storage unit shown in FIG. 1.

FIG. 1 shows a storage unit 100 for a galley. In this example, the storage unit 100 has a rear part 110 and a front part 120. The rear part 110 may store a first item, and the front part 120 may store a second item. In other examples, the storage unit may be arranged with only one part, for example only a rear part 110 or only a front part 120. For instance, the storage unit may only be arranged to store a single item (which may be retained at the rear of the storage unit or may be retained at the front of the unit). In further examples, the storage unit may have three or more parts. For instance, there may be at least one intermediate part between the rear part 110 and the front part 120.

The storage unit 100 includes a retaining assembly 104. The retaining assembly 104 has a retaining arm 105. The retaining arm 105 is movable between a retaining position, shown in FIG. 1, and a non-retaining position. The retaining assembly 104 is arranged to retain, i.e. prevent movement of, an item stored in the storage unit 100 in a retaining direction 106 when the retaining arm 105 is in the retaining position. For example, the retaining direction 106 in this example is the direction from the rear of the storage unit 100 to the front of the storage unit 100. For example, the storage unit 100 may be arranged to prevent forwards movement of a first item in the rear part 100 of the storage unit 100 and/or rearwards movement of a second item in the front part 120 of the storage unit 100 by obstructing such movement. In this example, the storage unit 100 is arranged to prevent both forwards movement of a first item in the rear part 100 of the storage unit 100 and rearwards movement of a second item in the front part 120 of the storage unit 100. In this example, rearwards movement of the first item in the rear part 100 of the storage unit 100 is prevented by the rear of the storage unit 100 and forwards movement of the second item in the front part 120 of the storage unit 100 is prevented by a first turn-button 101 and a second turn-button 102. In other examples, different means may be provided to prevent rearwards movement of the first item, for example a turn-button, a door, another retaining assembly, or the like. Similarly, in other examples different means may be provided to prevent frontwards movement of the second item, for example a front of the storage unit, a door, another retaining assembly, or the like.

In this example, movement of the retaining arm 105 between the retaining position and the non-retaining position is provided by rotating the retaining arm 105 in a plane 103 which is perpendicular to the retaining direction 106. In other examples, movement of the retaining arm 105 between the retaining position and the non-retaining position could be provided by moving the retaining arm laterally and/or rotation of the retaining arm in a different plane, for instance rotating the retaining arm in a plane parallel to the retaining direction.

The retaining position of the retaining arm 104 is adjustable in the retaining direction 106. For example, the retaining position of the retaining arm 104 may be adjusted towards the rear of the storage unit 100 so as to accommodate a larger item in the front part 120 and/or to secure a smaller item in the rear part 110.

In this example, the storage unit 100 is for an aircraft galley, however in other examples the storage unit 100 could equally be suitable for another galley, such as on a boat or a train.

In this example, the storage unit 100 is a galley trolley compartment for storing one or more galley trolleys. In other examples, the storage unit could be arranged to store other items, such as boxes or the like. For example, the storage unit 100 could be an overhead storage unit or the like.

FIG. 2 shows a retaining assembly 200. This may be similar to the retaining assembly 104 shown in FIG. 1.

The retaining assembly 200 includes a retaining arm 201, a mounting rod 202 and a biasing device 203. In this example, the retaining assembly 200 also includes a first limiter 204, an actuating device 205 and a bracket 210.

The retaining arm 201 is movable between a retaining position and a non-retaining position so as to selectively prevent movement in a retaining direction 206. In this example, the retaining arm 201 is arranged to rotate between the retaining position and the non-retaining position. For instance, in this example rotation of the mounting rod 202 (via rotation of the actuating device 205) causes the retaining arm 201 to rotate. In other examples, the retaining arm 201 may rotate independently of the mounting rod 202, for example the retaining arm 201 may rotate around the mounting rod 202.

The retaining arm 201 is adjustably mounted on the mounting rod 202 such that its position on the mounting rod 202 is adjustable in the retaining direction 206. In this example, the retaining arm 201 may slide along the mounting rod 202 to adjust its mounting position.

The biasing device 203 provides a biasing force to bias the position of the retaining arm 201 on the mounting rod 202. In this example, the biasing device 203 is a spring 203 under compression, arranged to bias the position of the retaining arm 201 away from the spring 203. In other examples, the biasing device 203 could be, for example, a rubber tube, a magnet, a spring under tension or the like. In this example, the spring 203 is wound around the mounting rod 202 thereby providing a compact assembly. However, in other examples, the spring May not be wound around the mounting rod 202, for instance it could be substantially parallel to the mounting rod 202.

In this example, a first limiter 204 is included to limit movement of the retaining arm 201 caused by the biasing force, provided by the biasing device 203. In this example, the biasing device 203 provides a biasing force which pushes the retaining arm 201 away from the biasing device 203, and so the first limiter 204 is arranged on the opposite side of the retaining arm 201 from the biasing device 203. In other examples, the biasing device 203 could be arranged to pull the retaining arm 201 towards it, and so the first limiter 204 could be arranged on the same side of the retaining arm 201.

In this example, the first limiter 204 is adjustably mounted on the mounting rod. In other examples, the first limiter 204 could be arranged substantially parallel to the mounting rod 202 and may be adjustable in the retaining direction 206. In other examples, the first limiter 204 could be, for instance, mounted on the mounting rod 204 in a manner which allows the first limiter 204 to slide along the mounting rod 202. In this example, the first limiter 204 is a nut 204 threaded onto a threaded portion of the mounting rod 204. Rotation of the nut 204 (e.g. with a tool such as a spanner) will cause the nut 204 to move along the threaded portion in the retaining direction, thereby adjusting the position of the retaining arm 201.

As the first limiter 204 limits movement of the retaining arm 201 in the direction of the biasing force, adjusting the position of the first limiter 204 limits the position of the retaining arm 201 in the direction of the biasing force.

In this example, the biasing device 203 is arranged to provide a biasing force on the retaining arm 201 greater than the maximum expected force from a load, for example a galley trolley, a box, or the like. Therefore, in use the retaining arm 201 is always located at the furthest allowable position (allowed by the nut 204) along the mounting rod 202 in the direction of the biasing force. For example, the position of the retaining arm 201 on the mounting rod 202 may always be expected to be the position at which the first limiter 204 prevents any further movement in the direction of the biasing force. Hence, adjustment of the position of the retaining arm 201 on the mounting rod 202 may be achieved by adjusting the position of the first limiter 204. The spring 203 is not expected to compress or decompress in use, but rather will only be compressed or decompressed upon adjustment of the position of the limiter nut 204.

In other examples, the biasing force may not be greater than a maximum expected force from a load. Thus a maximum force may cause some movement of the biasing device 203. However, the stiffness of the biasing device 203 (combined with its preloaded force) may be sufficient to ensure that movement of the mounting position of the retaining arm 301 on the mounting rod 302 is limited to a maximum allowable distance when experiencing a maximum expected force. For example, in use the position of the retaining arm 201 may be allowed to move, but only slightly. Movement (e.g. compression) of the biasing device 203 will result in increased force until it counters the applied load. Thus the maximum expected load will be reached after a predetermined (and limited) degree of movement. This allows the system to have a little give under high forces.

In some examples, the mounting rod 202 may be installed directly to a storage unit or the like. In this example, the retaining assembly 200 includes a bracket 210. The mounting rod 202 is attached to the bracket 210 and the bracket 210 is suitable for installing in a storage unit or the like. The bracket in this example includes several mounting holes 211 for mounting the bracket 210 during installation.

In some examples, movement of the retaining arm 201 between the retaining position and the non-retaining position may be performed directly. In this example, the retaining assembly includes an actuating device 205 for moving the retaining arm 201 between the retaining position and the non-retaining position. This may enable remote actuation of the retaining arm 201. In this example, the actuating device 205 is a knob located on an end of the mounting rod 202. In other examples, the actuating device could be a lever, a handle or the like mounted on the mounting rod 202. In further examples, the actuating device 205 could be a device that is not attached to the mounting rod and/or the retaining arm. For example, actuation could be controlled electronically.

Figure 3A:
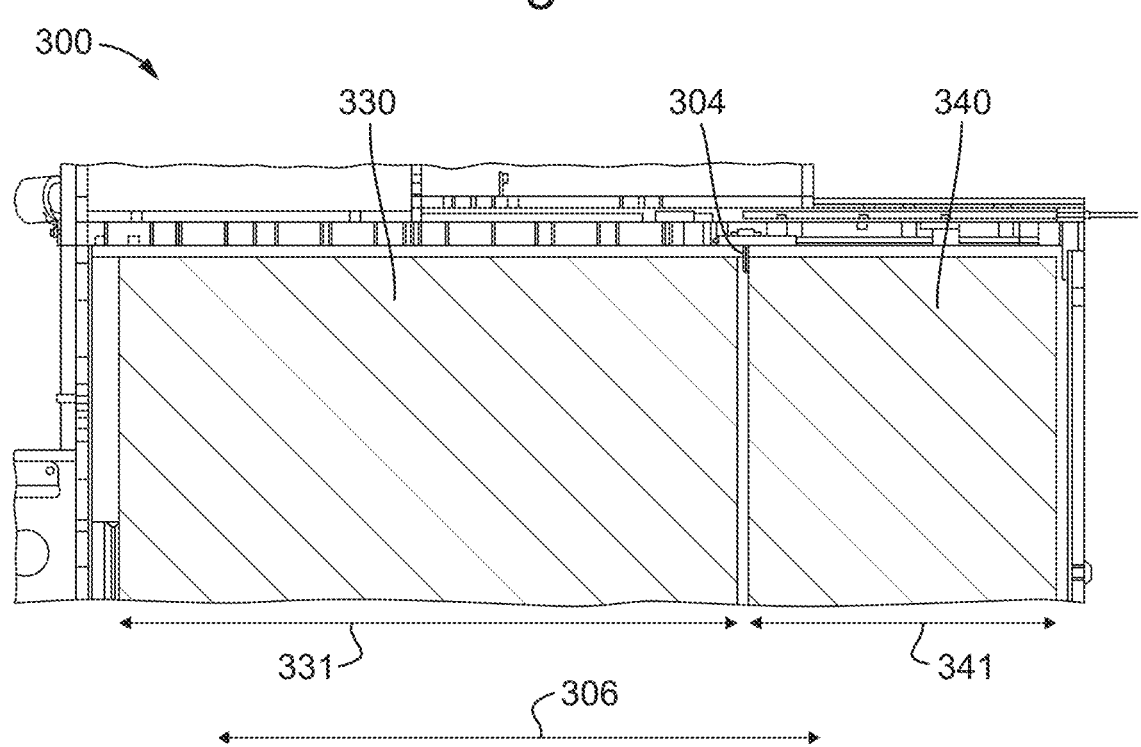
FIG. 3a shows a storage unit, such as the storage unit of FIG. 1, having a retaining assembly, such as the retaining assembly shown in FIG. 2, storing a first item and a second item.

FIG. 3*a* shows a side view of a storage unit 300, such as the storage unit 100 shown in FIG. 1.

The storage unit 300 has a rear part for storing a first item 330, which in this example is a first (large) galley trolley. The storage unit 300 also has a front part for storing a second item 340, which in this example is a second (small) galley trolley. In this example, a retaining assembly 304 is located between the first item 330 and the second item 340. Thus, the retaining assembly may prevent forwards movement of the first item 330 and/or rearwards movement of the second item 340. For example, if only one or the other of the first item 330 or the second item 340 is stored within the storage unit 300, the retaining assembly 304 may be used to secure the remaining item 330, 340 in the respective rear or front part of the storage unit 300. For removal of the first item 330, the second item 340 must first be removed, then the retaining assembly 304 must be operated so that the retaining arm is in the non-retaining position. Then the first item 330 can be removed. If the second item 340 is to be placed back in the storage unit 300 while the first item 330 is in use, the retaining assembly 304 is first operated so that the retaining arm is in the retaining position, then the second item 330 is pushed into the storage unit 300 until further rearward movement is prevented by the retaining arm, then the turn button(s) 102 at the front are operated to prevent forward movement of the second item 340. In this way the second item 340 is fully retained in the front part of the storage unit 300. In this example, the retaining direction 306 is the direction from the rear of the storage unit 300 to the front of the storage unit 300.

The first item 330 has a length 331 in the retaining direction 306. The second item 340 also has a length 341 in the retaining direction 306. In this example, the length 331 of the first item 330 is approximately 810 mm. In this example, the length 341 of the second item 340 is approximately 404 mm.

In this example, the storage unit 300 is configured to provide a small gap between the first item 330 and the retaining arm of the retaining assembly 304, for example a gap of approximately 8 mm. This gap may enable ease of use when positioning the first item 330 in the rear part of the storage unit 300 and moving the retaining arm to the retaining position. Similarly, in this example the storage unit 300 is configured to provide a small gap of approximately 8 mm between the retaining assembly 304 and the second item 340. Therefore, in this example there is a distance of 412 mm from the retaining arm's front face to the front of the storage unit 300 and a distance of 818 mm from the rear face of the retaining arm to the rear of the storage unit 300.

Figure 3B:
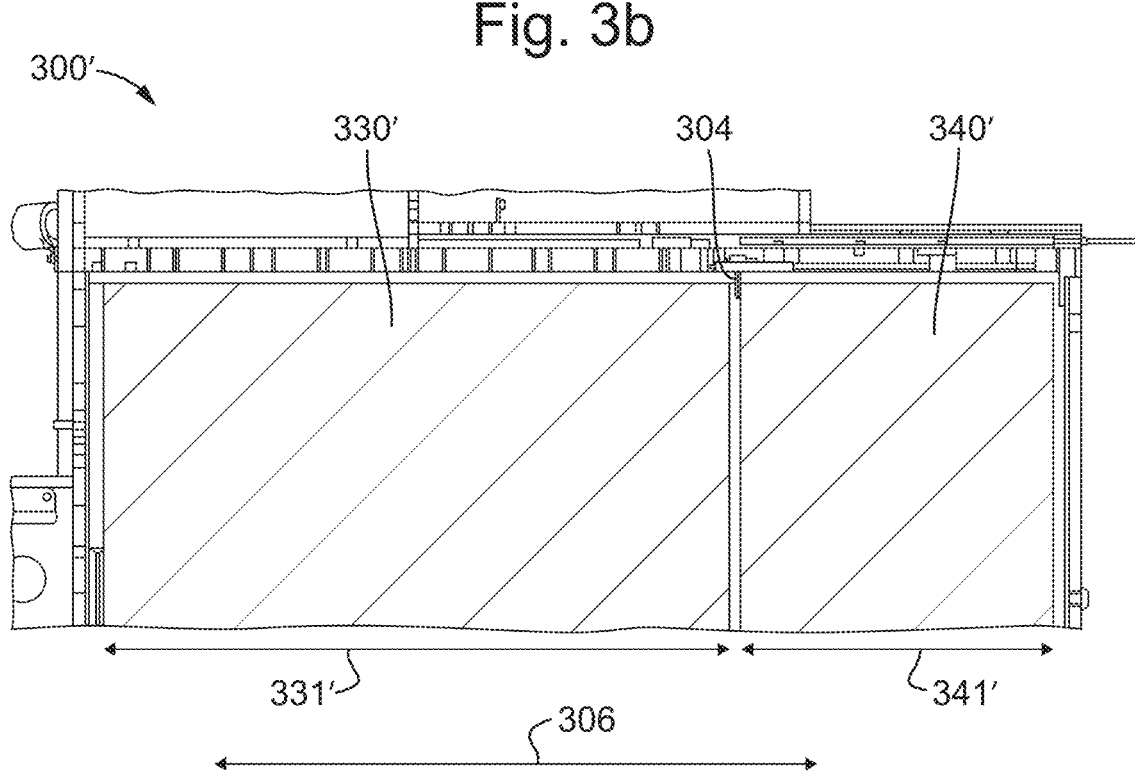

FIG. 3b shows another storage unit 300' such as the storage unit shown in FIG. 1. This storage unit may be similar to the storage unit 300 shown in FIG. 3a. However, this storage unit 300' has a different first item 330' with a different length 331'. In this example, this storage unit 300' also has a different second item 340' with a different length 341'.

In this example, the second item 340' in FIG. 3b has a greater length 341' in the retaining direction 306 than the second item 340 in FIG. 3a. Therefore, the retaining arm of the retaining assembly 304 must be positioned further from the front of the storage unit 300 to accommodate this second item 341'. In this example, the second item 340' has a length 341' that is 5.5 mm longer than the length 341 of the second item 340 in FIG. 3a. Therefore, in this example the retaining arm of the retaining assembly 304 must be moved by approximately 5.5 mm rearwards. As the position of the retaining arm 304 is adjustable in the retaining direction, the same retaining assembly 304 may be used for either configuration. Further, in some examples the storage unit 300' may even be the same storage unit 300 as shown in FIG. 3a with the same retaining assembly 304.

In this example, the first item 330' in FIG. 3b also has a greater length 331' in the retaining direction 306 than the first item 330 in FIG. 3a. Therefore, the retaining arm of the retaining assembly 304 must be positioned further from the rear of the storage unit 300' to accommodate this first item 331'. In this example, the first item 330' has a length 331' that is 9 mm longer than the length 331 of the first item 330 in FIG. 3a. Therefore, in this example the storage unit 300' is actually a different storage unit than the storage unit 300 shown in FIG. 3a, having a length in the retaining direction 306 that is 14.5 mm longer than the storage unit 300 shown in FIG. 3a. Despite the fact that the storage units 300, 300' are different and have different requirements, the same retaining assembly 304 may be used for either storage unit due to the adjustability of the retaining arm in the retaining direction 306. The retaining assembly 304 simply needs a minor configuration step when it is installed into the storage unit 300, 300' to set the retaining arm position appropriately for the items 330, 330', 340, 340'.

Figure 3C:
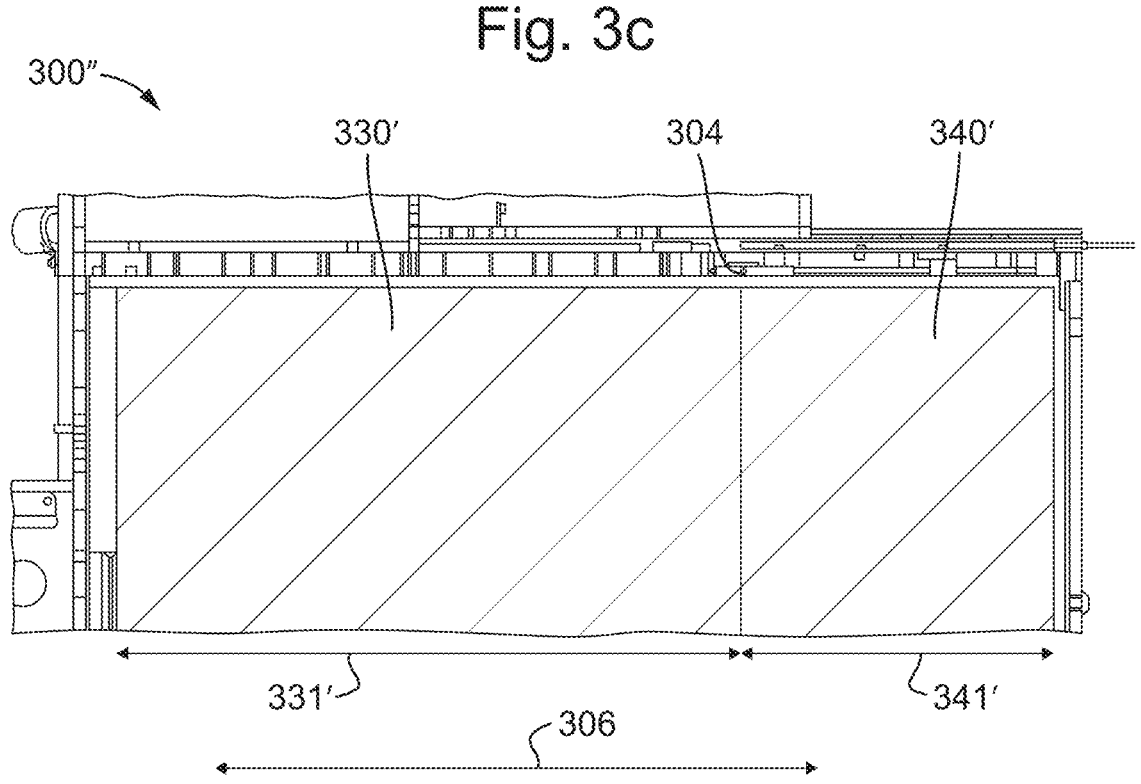
FIG. 3c shows the storage unit of FIG. 3a storing the first item and the second item of FIG. 3b.

FIG. 3c shows a storage unit 300" arranged to store the first item 330' and the second item 340' of FIG. 3b. As the first item 330' and the second item 340' have greater lengths 331', 341' in the retaining direction 306 than the first item 330 and the second item 340 in FIG. 3a, the retaining arm of the retaining assembly 304 may not be required to be in the retaining position when both the first item 330' and the second item 340' are stored in the storage unit 300. For example, there may not be sufficient space for the retaining arm to be in the retaining position when both the first item 330' and the second item 340' are stored in the storage unit 300". There may not be sufficient space in the storage unit 300" to have a small gap, such as a gap of approximately 8 mm, between the second item 340' and the front of the storage unit 300 if the retaining arm is in the retaining position. However, such a gap is possible with the retaining arm in the non-retaining position. This gap may be useful to enable positioning of the items 330', 340' within the storage unit 300" more easily while retaining them sufficiently securely in place.

Figure 3D:
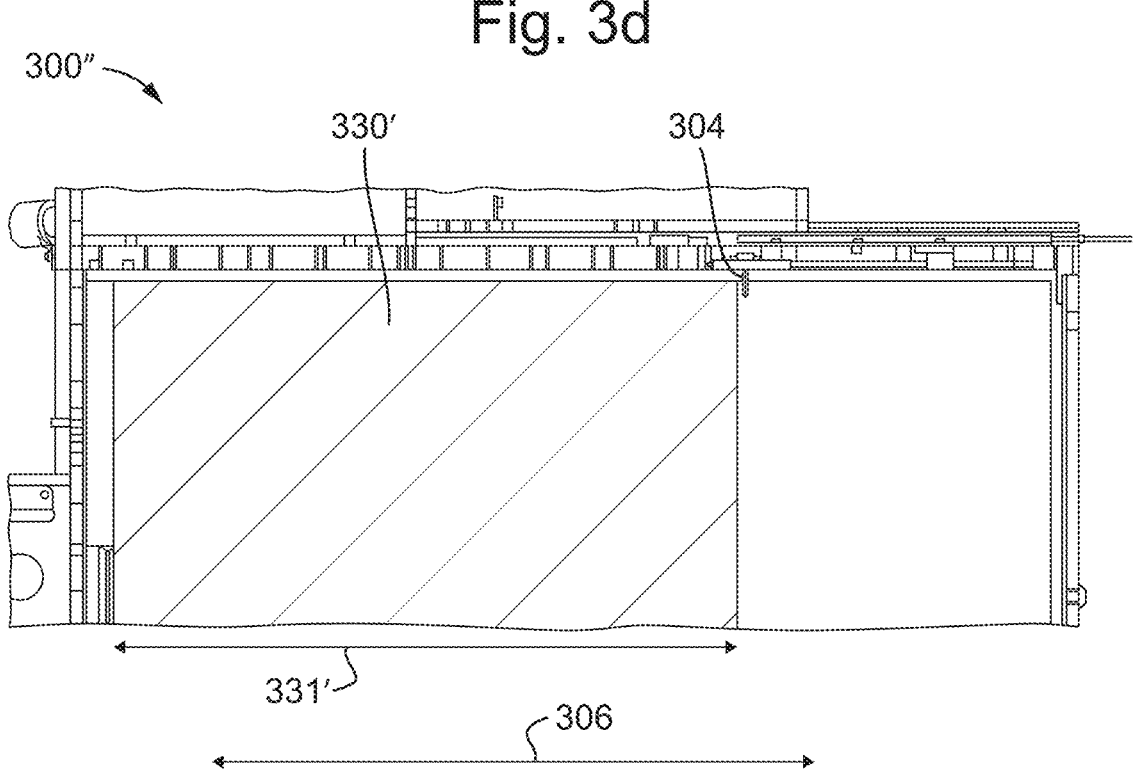
FIG. 3d shows the storage unit of FIG. 3c storing only the first item.

FIG. 3d shows the storage unit 300" of FIG. 3c arranged to store only the first item 330' of FIG. 3c in the rear part of the storage unit 300". As the second item 340' is not stored within the storage unit 300", the retaining arm of the retaining assembly 304 is used to retain the first item 330' in the rear part of the storage unit 300". Thus, in this example the retaining arm is in a first position at a first distance from the front of the storage unit 300. In this example, the distance of the rear face of the retaining arm from the front of the storage unit 300" is 409.5 mm, which corresponds with the length 341' of the second item 340'. In this example, this distance is configured to house the first item, which in this example has a length of 819 mm, and to provide a small gap, which in this example is 8 mm, between the front of the first item 340' and the rear face of the retaining arm.

Figure 3E:
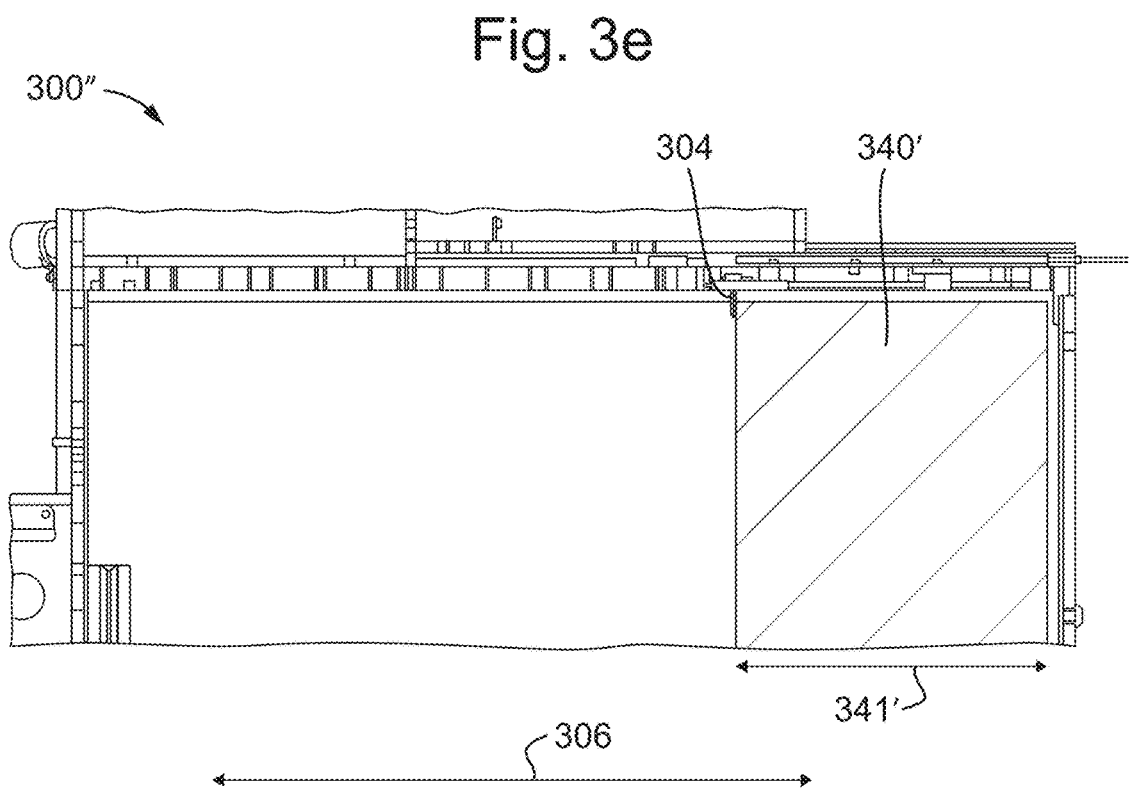
FIG. 3e shows the storage unit of FIG. 3c storing only the second item.

FIG. 3e shows the storage unit 300" of FIGS. 3c and 3d arranged to store only the second item 340' of FIG. 3c in the front part of the storage unit 300". As the first item 330' is not stored within the storage unit 300", the retaining arm of the retaining assembly 304 is used to retain the second item 340' at the rear. Thus, in this example the retaining arm is in a second position at a second distance from the front of the storage unit 300". In this example, the distance of the front face of the retaining arm from the front of the storage unit 300 is 417.5 mm, which corresponds with the length 341' of the second item 340' plus a small gap of 8 mm. In this example, the retaining arm has a thickness between it's front face and rear face of 6.35 mm. Therefore, the retaining arm must be moved by a distance of 14.35 mm towards the rear of the storage unit 300" in order to move from the first position, shown in FIG. 3d, to the second position, shown in FIG. 3e.

While this may be achieved by using the retaining assembly 200 shown in FIG. 2, adjustment of the retaining assembly 200 shown in FIG. 2 may require adjustment of the first limiter 204. This may not be convenient, as it may be inconvenient to perform this adjustment in use.

Figure 4:
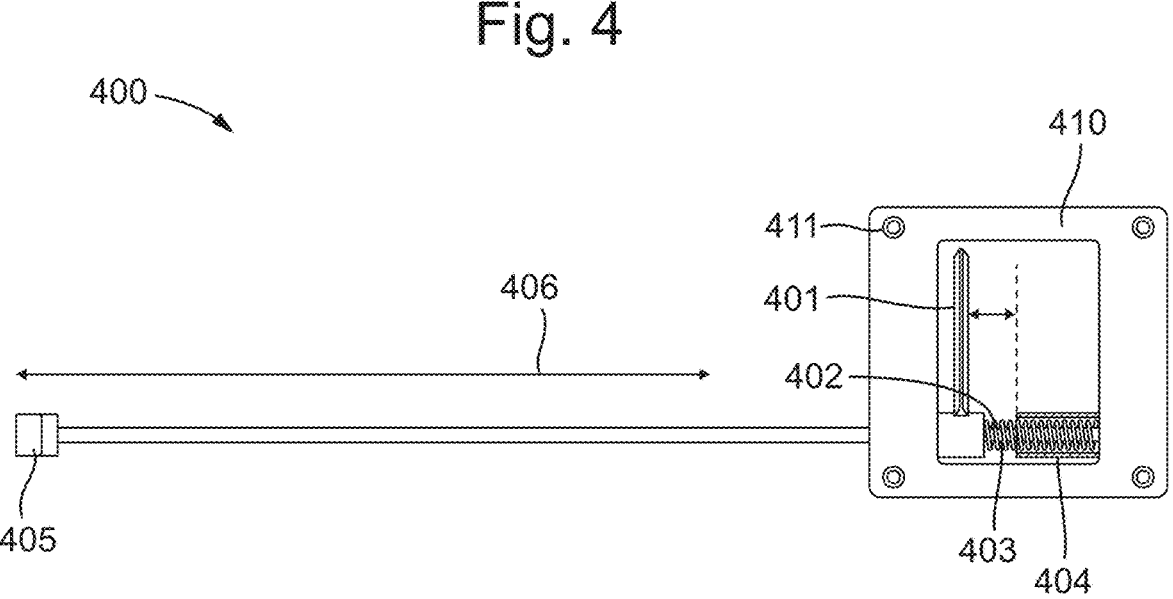
FIG. 4 shows another retaining assembly for a storage unit, such as the storage units shown in FIGS. 1 and 3.

FIG. 4 shows another retaining assembly 400, which may have various features in common with the retaining assembly 200 shown in FIG. 2. This retaining assembly 400 may be used in the examples shown in FIGS. 3c to 3e in order to adjust the position of the retaining arm in use from a first position, such as the position shown in FIG. 3d, to a second position, such as the position shown in FIG. 3e.

The retaining assembly 400 has a retaining arm 401, a mounting rod 402 and a biasing device 403. In this example, the retaining assembly 400 also has a second limiter 404 and a bracket 410 which has mounting holes 411. When in a retaining position, the retaining arm 401 is arranged to prevent movement in a retaining direction 406.

The retaining arm 401, the bracket 410 and the actuating device 405 in this example are similar to, and may be the same as, their respective counterparts shown in the retaining assembly 200 of FIG. 2.

In this example, the biasing device 403 is similar to the biasing device 203 shown in FIG. 2. However, unlike the biasing device 203 shown in FIG. 2, the amount of biasing force provided by the biasing device 403 of FIG. 4 is less than a minimum expected load on the retaining arm 401. For example, the biasing device 403 may provide a sufficient biasing force to bias the position of the retaining arm 401 to a first position when unopposed (i.e. a default position). However, when opposed by a minimum expected load, the biasing force may be insufficient to hold the retaining arm in the first position. Instead, the minimum expected load may be greater than the biasing force so as to move the position of the retaining arm 401 in a direction against the biasing force, which in this example is towards the biasing device 403.

The minimum expected load may be, for example, the minimum load expected to be applied to the retaining arm when positioning an item, such as the second item 340' of FIGS. 3c to 3e, on the opposite side of the retaining arm 401 to the biasing force. Thus, when positioning an item, such as the second item 340' of FIGS. 3c to 3e, against the retaining arm 401, the retaining arm 401 may be moved in a direction against the biasing force.

In this example, a second limiter 404 is included to limit movement of the retaining arm 401 in the direction against the biasing force, which in this example is towards the biasing device 403. In this example, the biasing device 403 provides a biasing force which pushes the retaining arm 401 away from the biasing device 403, and so the second limiter 404 is arranged on the same side of the retaining arm 401 as the biasing device 403. In other examples, the biasing device 403 could be arranged to pull the retaining arm 401 towards it, and so the second limiter 404 could be arranged on the opposite side of the retaining arm 401.

In this example, the second limiter 404 is a tube or sleeve positioned around the biasing device 403.

In this example, when a force is applied to move the retaining arm 401 against the direction of the biasing force, the retaining arm 401 moves in this direction until the second limiter 404 prevents any further movement. In this example, this corresponds to the second position of the retaining arm 401, such as the position of the retaining arm 401 shown in FIG. 3e.

In this example, the retaining assembly does not have a distinct first limiter, such as the first limiter 204 shown in FIG. 2. Instead, the bracket 410 limits the movement of the retaining arm 401 in the direction of the biasing force. Therefore, the bracket 410 may be considered to be the first limiter. The terminology second used for the second limiter 404 shown in FIG. 4 is merely used to differentiate it from the first limiter 204 shown in FIG. 2, thus a first limiter is not necessarily required in the example shown in FIG. 4. In other examples, it is possible to have both a first limiter 204, such as the first limiter 204 shown in FIG. 2, and also a second limiter 404, such as the second limiter 404 shown in FIG. 4.

In this example the mounting rod 402 does not have a threaded portion, such as the threaded portion of the mounting rod 202 in FIG. 2. However, in other examples the mounting rod 402 of FIG. 4 could have a threaded portion.

One possible usage scenario of the retaining assembly 400 will now be described to explain its operation. The scenario begins with an arrangement as shown in FIG. 3d in which a first item 330' is stored in a rear part of the storage unit 300". No second item 340' is stored in the storage unit 300". The retaining arm 401 of the retaining assembly 400 is biased by the biasing device 403 towards the front of the storage unit 300" such that it abuts the bracket 410, acting as a first limiter. This is the default position of the retaining arm and it is arranged to provide enough space at the rear of the storage unit 300", behind the retaining arm 401 for the first item 330' plus a gap of 8 mm. It is now desired to remove the first item 330' for use and to store the second item 340' so as to result in the arrangement shown in FIG. 3e. First, the retaining arm 401 is operated by the actuator 405 to rotate the retaining arm 401 into the non-retaining position. The first item 330' is now removed from the storage unit 300". Next, the retaining arm 401 is rotated back to the retaining position. At this time, the biasing device 403 still biases the retaining arm to the default position, closest to the front of the storage unit 300". Now the second item 340' is inserted into the front of the storage unit 300" until further rearward movement is prevented by the retaining arm 401. As the biasing device 403 has a low stiffness, it provides very little resistance to compression and thus the insertion of the second item 340' into the storage unit 300" causes the retaining arm 401 to be adjusted rearwardly, compressing the biasing device 403 until further rearward movement is prevented by the second limiter 404. The stiffness of the biasing device 403 is chosen so that the additional force required to insert the second item 340' is barely noticeable or not noticeable at all. Before insertion of the second item 340' into the storage unit 300", the distance between the front of the retaining arm 401 and the front of the storage unit 300" was smaller than the length 341' of the second item 340'. However, after insertion of the second item 340' into the storage unit 300", the retaining arm 401 has moved rearwardly such that the distance between the front of the retaining arm 401 and the front of the storage unit 300" is now 8 mm greater than the length 341' of the second item 340'. Finally, the turn buttons 102 at the front of the storage unit 300" are operated to retain the second item 340' against forward movement so that it is fully retained within the storage unit 300". It will therefore be appreciated that, while the storage unit 300" does not have sufficient space for the first item 330', the second item 340' and the retaining arm 401, the retaining arm is nevertheless capable of securing either one of the first item 330' or the second item 340' individually, and it can be moved out of the way when both items 330', 340' are to be stored in the storage unit 300". In all three scenarios, whichever items 330', 340' are stored in the storage unit 300" are retained safely and securely against excessive movement, while being given the required space for ease of insertion.

It will be appreciated by those skilled in the art that this disclosure has been illustrated by describing one or more specific examples thereof, but is not limited to these examples; many variations and modifications are possible, within the scope of the accompanying claims.

What is claimed is:
1. A retaining assembly for a galley comprising:
a retaining arm;
a mounting rod; and
a biasing device;
wherein the retaining arm is movable between a non-retaining position and a retaining position;

when in the retaining position, the retaining arm is arranged to prevent movement in a retaining direction;

wherein the retaining arm is adjustably mounted to the mounting rod such that its position on the mounting rod is adjustable in the retaining direction; and wherein the biasing device is arranged to provide a biasing force on the retaining arm to bias a position of the retaining arm on the mounting rod, the biasing force configured to cause an adjustment of the position of the retaining arm on the mounting rod in a direction of the biasing force and permitting adjustment in an opposite direction by application of a force greater than the biasing force.

2. The retaining assembly as claimed in claim 1, further comprising a first limiter arranged to limit movement of the retaining arm caused by the biasing force.

3. The retaining assembly as claimed in claim 2, wherein the first limiter and the biasing device are arranged on opposite sides of the retaining arm.

4. The retaining assembly as claimed in claim 2, wherein the first limiter is adjustably mounted to the mounting rod such that its position on the mounting rod is adjustable in the retaining direction.

5. The retaining assembly as claimed in claim 1, wherein the biasing device is arranged to provide a biasing force greater than 100 Newtons.

6. The retaining assembly as claimed in claim 1, wherein the biasing device is arranged to provide a biasing force less than 100 Newtons.

7. The retaining assembly as claimed in claim 1, further comprising a second limiter arranged to limit movement of the retaining arm against the biasing force.

8. The retaining assembly as claimed in claim 7, wherein the second limiter and the biasing device are arranged on the same side of the retaining arm.

9. The retaining assembly as claimed in claim 7, wherein the second limiter is a tube or sleeve positioned around the biasing device.

10. The retaining assembly as claimed in claim 1, wherein the retaining arm is movable between the non-retaining position and the retaining position by rotating in a plane substantially perpendicular to the retaining direction.

11. The retaining assembly as claimed in claim 1, wherein the biasing device is a spring, and wherein the spring is a coil spring wound around the mounting rod.

12. A storage unit for storing one or more items in a galley, the storage unit comprising a retaining assembly the retaining assembly comprising:

a retaining arm;

a mounting rod; and a biasing device;

wherein the retaining arm is movable between a non-retaining position and a retaining position;

when in the retaining position, the retaining arm is arranged to prevent movement in a retaining direction;

wherein the retaining arm is adjustably mounted to the mounting rod such that its position on the mounting rod is adjustable in the retaining direction;

wherein the biasing device is arranged to provide a biasing force on the retaining arm to bias a position of the retaining arm on the mounting rod, the biasing force configured to cause an adjustment of the position of the retaining arm on the mounting rod in a direction of the biasing force and permitting adjustment in an opposite direction by application of a force greater than the biasing force, and wherein the retaining arm is arranged to retain the one or more items in the retaining direction when the retaining arm is in the retaining position.

13. The storage unit as claimed in claim 12, wherein the storage unit is a galley trolley compartment and wherein the one or more items are galley trolleys.

14. The storage unit as claimed in claim 12, wherein the storage unit is arranged to store a first item in a rear part of the storage unit and the storage unit is arranged to store a second item in a front part of the storage unit;

wherein the retaining assembly is arranged to retain:

the first item against forward movement from the rear part; or the second item against rearward movement from the front part; or the first item against forward movement from the rear part and the second item against rearward movement from the front part.

15. The storage unit as claimed in claim 14, wherein the mounting position of the retaining arm is adjustable in use to move between a first position and second position;

wherein when in the first position, the retaining arm is arranged to retain the first item against forward movement from the rear part; and wherein when in the second position, the retaining arm is arranged to retain the second item against rearward movement from the front part.

* * * * *